United States Patent
Smith et al.

(10) Patent No.: US 6,721,572 B1
(45) Date of Patent: Apr. 13, 2004

(54) MOBILE COMMUNICATION OPTIMIZATION NEAR WIRELESS DEAD ZONE REGIONS

(75) Inventors: Gordon James Smith, Rochester, MN (US); George Willard Van Leeuwen, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/534,508

(22) Filed: Mar. 24, 2000

(51) Int. Cl.[7] .................................................. H04Q 7/20
(52) U.S. Cl. ................................. 455/456.1; 455/422.1; 370/328
(58) Field of Search ......................... 455/422.1, 456.1, 455/440, 421, 67.1, 404.2, 565; 370/328

(56) References Cited

U.S. PATENT DOCUMENTS

| | | | |
|---|---|---|---|
| 4,814,711 A | | 3/1989 | Olsen et al. |
| 5,189,734 A | | 2/1993 | Bailey et al. |
| 5,235,633 A | | 8/1993 | Dennison et al. |
| 5,257,406 A | | 10/1993 | Ito |
| 5,568,654 A | | 10/1996 | Fukawa |
| 5,877,695 A | * | 3/1999 | Kubes et al. ............ 340/815.4 |
| 6,005,848 A | | 12/1999 | Grube et al. |
| 6,011,973 A | * | 1/2000 | Valentine et al. ............ 455/456 |
| 6,038,444 A | * | 3/2000 | Schipper et al. ............ 455/421 |
| 6,097,958 A | | 8/2000 | Bergen |
| 6,128,485 A | * | 10/2000 | Mori et al. ............... 455/422.1 |
| 6,205,330 B1 | * | 3/2001 | Winbladh .................... 455/426 |
| 6,327,471 B1 | * | 12/2001 | Song .......................... 455/440 |
| 6,343,212 B1 | * | 1/2002 | Weber et al. ............. 455/404.1 |
| 6,349,206 B1 | * | 2/2002 | Reichelt et al. .............. 455/421 |
| 6,363,335 B1 | * | 3/2002 | Monroe et al. .............. 455/557 |
| 6,421,544 B1 | * | 7/2002 | Sawada ....................... 455/565 |
| 6,597,906 B1 | * | 7/2003 | Van Leeuwen et al. ..... 455/436 |

\* cited by examiner

*Primary Examiner*—William Trost
*Assistant Examiner*—Danh Le
(74) *Attorney, Agent, or Firm*—Christopher H. Lynt; Matthew J. Bussan; Leslie J. Payne

(57) ABSTRACT

As a mobile unit approaches a communication dead zone, a call is automatically disconnected in an orderly fashion. The call can be automatically reconnected when the mobile unit exits the communication dead zone. As part of the orderly disconnection, parties to the call are given an audible and/or visual message and/or sensual tactile stimulus letting them know that a dead zone is being approached. The message can also indicate the time before entering the dead zone, and/or what actions will be taken. Similarly, when the mobile unit is about to exit the dead zone, the parties can be given an indication prior to being reconnected.

36 Claims, 3 Drawing Sheets

MOBILE COMMUNICATION OPTIMIZATION NEAR WIRELESS DEAD ZONE REGIONS

BACKGROUND OF THE INVENTION

FIELD OF THE INVENTION

The invention relates to the field of telecommunications, and in particular, to mobile communication, e.g., cellular voice and/or data, call optimization near wireless dead zone regions.

BACKGROUND INFORMATION

Mobile communication, e.g., cellular telephone communication, usually involves the exchange of radio transmission signals between a mobile unit (mobile client) and a base station. With ground-based mobile units, these radio transmission signals are often subject to a number of phenomena which can limit communication, including naturally occurring variations in geography, such as hills and valleys. This is because mobile communications is often based on a point-to-point, line-of-sight transmission path between the mobile unit and the base station. Terrain variations, man-made obstacles, and the like, can interfere with the communications, resulting in what are called "dead zones."

Dead zones are geographical areas where communications signals do not penetrate or are too weak to provide for reliable communications. Such zones can be caused by radio signal shadowing, e.g., as occur when a mobile unit travels behind a hill, under a bridge or through a tunnel, or they can be due to signal reflections/images in radio signal patterns caused by the signals bouncing off radio-reflective objects, such as buildings, etc. An absorption of signals can also occur under certain circumstances resulting in a dead zone. For example, some non-reflective (¼ wavelength) coatings are known which are generally absorptive of particular radio signals, and such a phenomena can occur naturally as well.

With the advent of enhanced mobile personal communications equipment beyond the simple voice cell-phone to relatively more complex mobile data transmission and receiving devices, dead zones have become more than just a simple annoying interruption of a telephone conversation.

Some examples of the types of communications that are being considered, developed and/or implemented include traffic information updates, static and dynamic point-to-point routing, remote diagnostics, user comfort settings, and regional radio station detection and selection. A Concept Car was shown at the 1997 COMDEX show in Las Vegas, which incorporates so-called "telematics." Telematics can include in car communication with the Internet for accessing e-mail, web pages, personal preference items (stocks, weather, sports, etc.), memos, navigation, car security/safety (911), as well as being expanded for video/movies for the passengers, for example. Along with these personal communications tools, if appropriate, an interface to the on-board vehicle control and diagnostic computer bus through an engine compartment firewall could be provided so that the user or remote fleet management system (for trucks) can run diagnostics on the automobile engine, as well as monitor vehicle progress on a route.

It should be apparent that, should a mobile unit enter a dead zone during a data transmission, substantial time and bandwidth may be wasted attempting a complete retransmission of the data when communication is impossible. More serious consequences could result due to a partially garbled and/or delayed transmission. For example, an investor might be attempting to conduct an on-line trade in the stock market where a delay of even a few minutes could mean the difference between a profitable trade and a missed opportunity.

According to a copending application assigned to the same assignee as the present application, Ser. No. 09/133,649, filed Aug. 13, 1998, entitled "ERROR CORRECTION FOR WIRELESS NETWORKS" (attorney docket YO998167): "methods, devices and systems are presented for providing service providers and/or end users of mobile stations to monitor and/or report regions with high error rates and/or dead zones . . . each mobile station periodically compares its current location with the data base [of locations with errors] . . . [T]he results of this comparison enables the mobile unit to anticipate connection problems" (Abstract, see also page 20, line 16 to page 21, line 18). The mobile unit uses an on-board GPS (global, positioning satellite system) to get its current location (see page 8, lines 4 to 20).

Further according to the copending application serial number 09/133,649, the mobile units include an error rate monitor to monitor a reception error rate, and a message processor to send an error message to a base station when the error rate rises above a preset threshold (page 21, line 19 to page 22, line 8). A database that contains records of all error messages may be maintained, used to map areas of reception dead zones, and queried by a mobile user to determine if the user is entering a dead zone—the base station may then inform the mobile user of an appropriate step to take to maintain connectivity (page 22, line 15 to page 23, line 2). According to the copending application, a user may be given a route to avoid dead zones, and/or given a warning signal, i.e., an audible alarm, that the user is approaching a dead zone (page 23, lines 12 to 17, page 38, lines 239 to 245, page 39, lines 259 to 261, and page 40, lines 262 to 263).

However, sometimes taking steps to maintain connectivity may not be convenient or even possible. For example, if the mobile unit is a large truck or even a passenger car, it may be that there is no place to pull over the mobile unit, turn around or otherwise take another route to avoid a dead zone. In some areas, such as the U.S. East Coast Interstate 95 North-South corridor, alternative routes are either limited or non-existent.

Further, while giving a warning signal as an audible alarm, that a dead zone is being, approached, as in copending application Ser. No. 09/133,649, may be useful, it would be advantageous to provide a mobile telecommunications user with more than just a warning signal.

However, the method disclosed in copending application Ser. No. 09/133,649, does not consider what should be done about a client exiting a dead zone. Further, a method for determining the location of a Dead Zone given in the copending application is to examine the error rates for transmissions. Error rates, however, may be due to a multitude of other factors besides a dead zone. For example, the transmitter may be faulty, the antenna on the transmitter may not be extended or is partially grounded, the batteries may be low in the mobile unit, there may be a temporary obstruction, etc.

A system providing improved wireless mobile telecommunications transmission/reception control based on relative geographical position information is known from copending application serial number 09/239,854; attorney docket RO998-230 (IBM-124), assigned to International Business Machines Corporation, filed Jan. 29, 1999, and entitled "MOBILE CLIENT-BASE STATION COMMUNICATION BASED ON RELATIVE GLOBAL POSITION INFORMATION." As discussed in that application, a mobile communication device user's location, speed and direction can be determined using, for example, global positioning system satellites (GPS), and compared to a database of wireless topography to predict entry into so-called dead zones, and determine appropriate actions to take. As discussed in that application, data loss can be avoided when a communications system gives priority to a mobile unit transmitting or receiving data which is approaching a dead zone. Further, when the mobile unit knows of the approach of a dead zone, data transmission, either to or from the mobile unit in question, can be expedited or delayed. When the system can predict when a mobile unit will exit a dead zone, more efficient use of communications resources can be accomplished. Data to be transmitted to the mobile unit from the base station can be stored in anticipation of dead zone exit. Likewise, the mobile unit can buffer data transmission to the base station while in the dead zone in the same way. Scheduling and prioritization of communications, including expediting or delaying transmissions, based on location information and trajectory is therefore implemented according to that application.

FIG. 1 illustrates a two-dimensional simplification of a mobile client, dead zone and base station scenario from the just-mentioned copending application Ser. No. 09/239,854, for a single mobile client and a single dead zone. There could be any number of mobile clients and dead zones, but the principles described below for the simple case can easily be extended to these with the addition of some priority procedure, that is, where a priority for transmission and reception of information is based on how close a given mobile unit is to a given dead zone, how much bandwidth is used by a given mobile unit, the urgency of the transmission, etc.

As is explained in the copending application Ser. No. 09/239,854, in the simple case of FIG. 1, the base station is assumed to be the origin of a 2-dimensional coordinate system which can easily approximate the surface of the earth over some local region served by the base station. Note that the location of the base station at (0,0) is purely for illustration purposes and can easily be shifted to be any geographical position desired in longitude and latitude, for example. In the base station, the respective coordinates of a plurality of dead zones are stored. Such coordinates may be referred to sometimes herein as simply dead zone locations. Only one such dead zone is shown although there could be many such zones in a geographical area covered by the base station.

As is explained in the copending application Ser. No. 09/239,854, a dead zone location can be stored as a sequence of $(x_{ij}, y_{ij})$ coordinates where the index referring to a particular x,y coordinate pair i=1, . . . N. So that each jth dead zone is represented faithfully, N is chosen to be a suitably large integer. This is, of course a two-dimensional simplification of the three-dimensional general case which is perfectly acceptable for a ground-based mobile unit since any ground position will have a fixed altitude. However, for a non-ground-based mobile unit, such as an aircraft or spacecraft, the dead-zone third dimension would be taken into account. This is applicable to the general three-dimensional case by extension, the two-dimensional simplification being presented for purposes of explanation. As is known, the GPS system, for example, provides latitude, longitude and altitude data.

As is explained in the copending application Ser. No. 09/239,854, for the purposes of estimating the time remaining before the mobile client enters a dead zone, the boundaries of the dead zone are progressively refined as the mobile client approaches. This is a fractal-type methodology that advantageously minimizes the required computations that need to be performed by either a processor at the base station or mobile client or both. This can be implemented by having the base station server processor, for example, store dead zone boundaries in a fractal form so that details of a boundary can be made progressively more detailed as a mobile unit approaches the dead zone. As is known, the term fractal is derived from "fractional geometry." Simply put, a fractal is a self-similar thing that has a fractional dimension.

As is explained in the copending application Ser. No. 09/239,854, for example, a complex, twisting coastline or the outline of a tree's branch structure, is something which theoretically has an infinite length and can be considered more than just a one-dimensional line but less than a two-dimensional plane. A well known "fractal" is the Koch curve, which is a 1.2618-dimensional object, that is, an object having a fractional dimension. Imagine a straight line, which is a one-dimensional object. Now, put a kink in the line, making it more complex than a straight line, but not yet a plane. Next put a kink in each line segment formed by the first kink, and so on. The result is the Koch curve. The kinks have caused the one-dimensional line to grow towards becoming a two-dimensional plane, since the original line expands in the "height" direction, however, it is not a two-dimensional object, like a plane, because it is not a closed curve. Another example is the so-called Sierpinski's triangle (or gasket). To form this object, one starts with a two-dimensional filled triangle, and then remove the middle triangle of the filled triangle, which leaves behind inside the original triangle, three smaller filled triangles. The process is repeated for the smaller triangles, and so on an infinite number of times. The result is something dimensionally less than the original two-dimensional triangle, but more than simply a one-dimensional line, i.e., an object said to be approximately 1.5850-dimensional.

Returning to FIG. 1, as is explained in the copending application Ser. No. 09/239,854, when the mobile client is far from the illustrated dead zone, the boundaries of the dead zone are approximated by its "corners:" $(X_1, Y_1)$ and $(X_2, Y_2)$. That is, at some distance, the dead zone can be approximated as a linear region between points $(X_1, Y_1)$ and $(X_2, Y_2)$, i.e., a one-dimensional line. For the purposes of this analysis, it can be assumed that the terrain between the dead zone and the land-based mobile unit (client) is flat so that the height of the dead zone can be disregarded. (At a sufficiently large distance, the dead zone could be approximated as a zero-dimensional point.)

As is explained in the copending application Ser. No. 09/239,854, as the mobile client approaches the dead zone, the dead zone boundary is more complex than the simple one-dimensional line, but something less than a two-dimensional plane, i.e., a fractal-type boundary. For the purposes of determining an approximate time before the mobile client reaches the dead zone boundary, as the mobile client gets closer, the approximation should and can be refined to be more accurate. When the distance is great, a rough estimate is acceptable since the time before the mobile client reaches the dead zone boundary may be on the order of half an hour, for example, giving ample time to prepare for dead zone entry. However, as the distance grows smaller, and the time scale is reduced to minutes, a more precise estimate of the time is clearly required. As already mentioned, this can be implemented by having the base station server processor store dead zone boundaries in a fractal form so that details of a boundary can be made progressively more detailed as a mobile unit approaches the dead zone.

As is explained in the copending application Ser. No. 09/239,854, it can be appreciated that, like other real-world phenomena, such as tree-branch structures, the boundary of a dead zone does not adhere to purely Euclidean geometry, i.e., it is probably not a perfectly smooth curve or boundary line. However, this does not mean that it is immune to mathematical modeling. A complex, even randomly irregular object, such as the dead zone boundary being considered here, can be modeled approximately using a fractal approach, as will now be explained using the concept of iterative function systems (IFS's).

As is explained in the copending application Ser. No. 09/239,854, an iterative function system (IFS) is essentially a system of mappings from one coordinate system to another. In particular, it is a system of functions, e.g., affine transformations, that is iterated many times. An affine transformation can be represented by combination of a rotation, a reflection, and a translation. As a simple example, a random method will be described. It begins with an object defined by a boundary or "bounding" frame, and subdivided it into some number of frames within the bounding frame, having a size and orientation with respect to the bounding frame which will define the reflection, rotation and translation (the affine transformation) in the result. Then the method picks any point inside the bounding frame, and maps it to a randomly selected subdividing frame within the bounding frame. By "map" is meant placing a new point within the randomly selected subdividing frame positioned relative to the subdividing frame just as the original point was positioned relative to the bounding frame. That is, if the original point was in the middle of the bounding frame, then the new point would be positioned in the middle of the randomly selected subdividing frame. This new point will have a different position relative to the bounding frame than the original point. The new point is then mapped into another randomly selected subdividing frame, and so on. The result of these repetitive affine transformations converges on a fractal. The random IFS method of generating fractals does not produce "perfect" fractals, however it is computationally undemanding. It was "random" because the subdividing frame was selected randomly. There is also a deterministic IFS method. In the deterministic method, every point in the bounding frame is first mapped into each of the subdividing frames. The each subdividing frame is subdivided itself into the same number of original subdividing frames. That is, if there were originally four subdividing frames, each would be divided into four frames, for a total of sixteen frames. The mapping of each point in the original four subdividing frames into the their respective four frames is then performed, and so on.

As is explained in the copending application Ser. No. 09/239,854, other fractal methods are known, for example a relatively newer fractal method (circa 1968) is called the L-system fractal method after its designer, Aristrid Lindenmayer. One characteristic of fractals which bears mentioning is their so-called "self-similarity." That is, reduced versions of the fractal appear throughout the fractal. When a portion of a fractal is magnified, the magnified portion replicates the overall fractal. Further, a fractal can be used to describe any process or image or object that exhibits this self-similarity characteristic. Interestingly, laser generated holographs exhibit this characteristic, as do many naturally occurring phenomena. A well-known fractal geometry is the so-called Mandelbrot set, named for IBM mathematician, Benoit B. Mandelbrot, who is credited with coining the term "fractal." The Mandelbrot set is infinitely complex, yet can be fully described with a 10-line computer program.

As is explained in the copending application Ser. No. 09/239,854, a fractal model of the dead zone boundary is useful because of the self-similarity characteristic described above. Approaching the dead zone boundary is analogous to enlarging a fractal edge, that is, increasing the magnification of the fractal. As mentioned above, reduced versions of the fractal appear throughout the fractal no matter what the scale, i.e., magnification. Applying a fractal model to the dead zone boundary simply means that an iterative fractal-like methodology is used to refine the time estimate as the mobile unit gets closer to the boundary.

The mobile client is shown in FIG. 1 located at coordinates $(X_M(t), Y_M(t))$. The "t" indicates that the position of the mobile client is a function of time, i.e., the position of the mobile client will change over time as the mobile client moves. As the mobile client instantaneous position changes over time, a trajectory, i.e., a direction of travel, and a rate of travel can be surmised. An instantaneous position (current position), a direction of travel, and a rate of travel, at a given point in time, will be referred to as simply "position information." This instantaneous location and trajectory, i.e., position information, is periodically communicated to the base station, in particular, using a packet protocol which is described below.

As is explained in the copending application Ser. No. 09/239,854, based on the position information received by the base station and pre-stored dead zone location information stored at the base station, information about the estimated time until the mobile client enters a particular dead zone can be determined by the base station and communicated to the mobile client. This two-way exchange of information is advantageous. Computational power can be advantageously located at the base station, accomplishing enhanced functionality, while keeping the required size and complexity of the mobile unit at an acceptable level.

As is further explained in the copending application Ser. No. 09/239,854, when the mobile client has entered a dead zone, it can use information about the extent of the dead zone previously provided by the base station to estimate the time when communication with the base station will again be possible. The mobile client can avoid a disadvantageous waste of resources trying to communicate with the base station when in the dead zone. Also, the instant that communication is again possible, the mobile client can be ready to begin transmission, having anticipated dead zone exit time. While traversing the dead zone, the mobile client can go into a sleep mode to conserve energy with a timer set to wake it up at the anticipated dead zone exit time. Alternatively, the mobile unit can periodically "ping" the base station to see if communications can be reestablished. The latter is useful for situations where dead zones, or areas within a dead zone, are known to change dynamically and/or apparently randomly, i.e., there may be times and places when communications can be reestablished but these must be tested for because they are not wholly predictable. Although the testing uses some resources, if the testing determines that communication can be reestablished, the gain in efficiency may be worth the effort.

As is further explained in the copending application Ser. No. 09/239,854, new information about the boundaries of a dead zone, which can be dynamic, can be included in the transmission from the mobile client to the base station after exiting the dead zone, for example. The base station can advantageously use this dead zone information to update the database containing the location and extent of dead zones, if appropriate. This could be implemented by, for example, at some time prior to the anticipated entry of a dead zone, sending a test signal from the base station to the mobile client such that at the moment the test signal is lost, indicating a dead zone entry point, instantaneous location information can be stored in the mobile unit for later transmission to the base station. Similarly, just prior to anticipated exit of the dead zone, the mobile unit could begin transmission of position information which, when received by the base station, would indicate an exit point boundary of the dead zone. Should a sufficient statistically meaningful pattern emerge from this, for example, that a particular dead zone has a predictable extent at a particular time on a particular day of the year, or under other recognized circumstances, this can be integrated into the data base for additional gains in efficiency.

As is explained in the copending application Ser. No. 09/239,854, this is analogous to the information provided to ground control stations by airline pilots regarding the location of air turbulence. These updates allow ground control to more accurately estimate where turbulence exists which benefits other airliners in the area. In a similar fashion, these dead zone "updates" provided by mobile client(s) can benefit the base station(s) and other mobile clients.

As is explained in the copending application Ser. No. 09/239,854, a measure of the estimated time until the mobile client enters the dead zone is calculated, and refined using fractal-type methodology, which is described in detail in the copending application. However, a rigorous mathematical explanation is not necessary for a complete understanding of the subject matter of the present application. The refinement for estimates of the exact interception point with the dead zone continues until the mobile client enters the dead zone. This refinement process is of a fractal-nature, since the scale of the dead zone boundary is constantly improved (like increasing fractal magnification) as the mobile client approaches.

As is explained in the copending application Ser. No. 09/239,854, when the mobile client is in the dead zone, there is no further communication possible with the base station (by definition). However, it can be presumed that the mobile client is still aware of its position either from via GPS data from a satellite, or from some other geo-positioning system, e.g., an internal inertial guidance system. Before the mobile client enters the dead zone, information concerning the expected time when the dead zone will be exited can be sent from the base station. Alternatively, the base station can send relevant dead zone coordinates for the boundary at which point the mobile client is expected to exit the dead zone. Calculations can then be performed by a processor in the mobile client.

As is explained in the copending application Ser. No. 09/239,854, in some cases, the mobile client may become immobile for some extended period of time. For example, a mobile client enters a building and then encounters an unexpected delay. When the base station and/or mobile client does not establish communication within some tolerance surrounding the expected time of emergence from a dead zone, the communication is placed on hold, and further data to be communicated would be placed in a hold queue. When communication is again possible, the mobile client provides its position information to the base station and the communication data is removed from the hold queue.

As mentioned above, a novel packet protocol is described according to the copending application Ser. No. 09/239,854. Assuming packet transmission (which is optimal in general for mobile communication), some packets include GPS information. Additionally, some packets can include the estimated time before a mobile client will enter a dead zone and/or how long communication will be interrupted. This information can be used to schedule transmissions between base station and mobile client. The protocol is set forth below:

TABLE 1

| Preamble | Data (e.g. 52 bytes) | GPS Data | ECC |
| --- | --- | --- | --- |

It should be readily apparent to one skilled in the art that the position information, e.g., GPS data, could be included in other data transmission formats and protocols, and is not limited to being implemented in a packet-based transmission system.

FIG. 2 illustrates an exemplary embodiment of a communications system according to the copending application Ser. No. 09/239,584. A mobile unit communicates with a base station by means of a wireless communications medium (air). A transceiver 504 in the mobile unit 500, under control of a processor 506, transmits and receives signals with a corresponding transceiver 508 and processor 510 at the base station 502. The mobile station 500 also includes some global positioning capability, e.g., a GPS receiver 512 receiving signals from a plurality of GPS satellites 513. The mobile unit 500 may have a data source 514, such as a personal computer, fax machine, or the like, which sends blocks of data through the processor 506 and transceiver 504 to the base station 502. The base station 502 would of course be connected to a telephone network (telnet) or satellite communications network (satnet), or combination thereof, e.g., the Iridium system which is a combination of terrestrial, satellite, and cellular networks, as represented by block 520, as is conventional. A map data base 516 is provided at the base station 502 and contains a data base of identified areas where communication is weak or cutoff completely, i.e., dead zones, within the geographical area served by the base station 502.

As is explained in the copending application Ser. No. 09/239,854, the map data base 516 could also contain some geographical data about adjoining areas served by other base stations (not shown) for those situations where a mobile unit 500 is traveling towards such an area. In such a case, the base station 502 could transmit location information to the mobile unit 500 concerning dead zones that adjoin the area served by the base station 502. Or it could be the case that a dead zone actually spans areas served by two different base stations, and such information can be passed to the mobile unit 500.

As is explained in the copending application Ser. No. 09/239,854, the mobile unit processor 506 processes the GPS data, and sends position/direction of travel information to the base station 502. The base station processor 510 receives the mobile unit's position/direction of travel information and determines the mobile unit's position relative to known dead zones, as described earlier. The processor 510 may also update the information in the map data base 516 based on the mobile unit's position, and any detected transmission errors or signal weakening, for example.

The present invention is directed at an improved system and methodology over the just-described system and methodology of the copending application Ser. No. 09/239,854.

Other systems and methods in the field are also known. For example, a network processing system which ensures processing continuity by holding data received from a network accessible application for transmission to a mobile unit only when the mobile unit is in actual wireless communication with the network is known (see, e.g., U.S. Pat. No. 5,564,070).

A hierarchical communication system which provides adaptive data rate selection based on the detected quality of communication, and which provides for resolving conflicts among competing communications protocols on a priority basis, is known (see, e.g., U.S. Pat. No. 5,696,903).

A way of locating mobile end users of a communications system and routing messages to the end users as they roam between communication networks having local servicing offices is known. This is based on user specific information which is stored by the local servicing offices, and can be used to track the end users. Stored messages and data can then be routed and forwarded to the end users (see, e.g., U.S. Pat. No. 5,659,596).

A method of controlling communication services based on geographical information is known. Communication is restricted if the unit requesting communications services is within a restricted geographical location, such as in proximity to a hospital having sensitive RF (radio frequency) medical devices, or granted if the unit is not within a restricted location (see U.S. Pat. No. 5,778,304).

A global positioning system (GPS) is known in which a mobile or stationary unit can ascertain its present location, latitude, longitude and altitude, by the detection and processing of signals from geo-synchronous satellites. Such systems are used to navigate aircraft as well as ground based vehicles (see, e.g., U.S. Pat. No. 5,606,506) and have been used to track mobile stations (see, e.g., U.S. Pat. No. 5,564,079). A GPS system has been integrated with an inertial navigation system (see, e.g., U.S. Pat. No. 5,606, 506).

The GPS has been used in conjunction with telephony to combine location identification with telephone number identification so that the geographical location of a particular telephone number user can be ascertained (see, e.g., U.S. Pat. No. 5,727,057).

The GPS has also been used in communication configuring of digital equipment based on its location using configuration data stored in the digital equipment (see, e.g., U.S. Pat. No. 5,635,940 and 5,581,261).

Another mobile communications tracking system which does not rely on GPS but instead uses signals exchanged with nearby cells is also known (see, e.g., U.S. Pat. No. 5,767,788).

However, it can be appreciated that further improvements in the field are desirable.

SUMMARY OF THE INVENTION

It is, therefore, a principle object of this invention to provide a method and apparatus for mobile communication, e.g., cellular voice and/or data, call optimization near wireless dead zone regions.

It is another object of the invention to provide a method and apparatus that solves the above mentioned problems so that improvements are realized in the handling of mobile communications with respect to dead zones.

These and other objects of the present invention are accomplished by the method and apparatus disclosed herein.

According to one aspect of the invention, a way of handling mobile voice/data phone calls, e.g., cellular telephone calls, as a user approaches and passes through wireless coverage dead zones is provided. Dead zones are areas where transmission and/or reception is substantially degraded or impossible.

According to another aspect of the invention, it is assumed that the cell phone user location is determined by one of a Global Positioning Satellite system (GPS), line-of-sight, dead reckoning, wireless triangulation, or an equivalent location determination system. The wireless user is also assumed to be mobile, which could be via an automotive, bicycle, train, airplane, walking, etc.

According to another aspect of the invention, based on methods and apparatus disclosed previously in copending application Ser. No. 09/239,854; the user's location, speed and direction are known, and compared to a database of wireless topography.

According to another aspect of the invention, a cellular phone user is approaching a wireless dead zone which is known by a server/base station. The server/base station tracks the cellular telephone user and the possible pathway (or pathways) through the dead zone. If the server predicts that the driver will be passing through the dead zone, the base station temporary interrupts the call to state that "User A" is approaching a dead zone.

According to an exemplary embodiment of the invention, a number of possible messages or actions could be set up by the cellular telephone user.

According to one embodiment of the invention, a message can be sent stating that the cellular telephone user will be entering a dead zone within a certain period of time and instructing the cellular telephone user or users on what actions to take. For example, the message could be a voice message such as: "You will be approaching a dead zone in the next 2 minutes. Please end the call at this time. You will need to reconnect after 10 minutes."

According to another aspect of the invention, an automatic disconnect and reconnect can be provided based on dead zone entry and exit. The automatic reconnect can be provided by the cellular system as a standard feature or as a paid option.

According to another aspect of the invention, a message can state what action the cellular telephone system will be taking automatically. For example, the voice message might be: "You are approaching a dead zone and will be entering the dead zone in approximately the next 2 minutes. I will be dropping the call in 1 minute and will reconnect within the next 10 minutes after passage through the dead zone."

According to another aspect of the invention, if a data transmission is involved, such as e-mail or data download, similar measures can be implemented. Instead of a voice message being heard through the cellular telephone headset or ear-piece, the message can be directed to the user's personal computer audio system, for example. Alternatively, the message can be displayed on the screen of the personal computer.

According to another alternative aspect of the invention, a flashing light somewhere in the user's vehicle can be used to warn of an impending dead zone. In this case, a yellow or amber light could initially be flashed slowly as the user approaches a dead zone and then the flashing could speed up the closer to the dead zone the user gets. Once in the dead zone, a red light could be flashed. As the user approaches the end of the dead zone, the amber or yellow light could again flash first slowly and then more rapidly, until as the user exits the dead zone, the light could change to green to indicate the dead zone has been exited.

According to another aspect of the invention, as previously disclosed in copending application Ser. No. 09/238,854, the time calculated for passing through the dead zone can be based on the dead zone size and the estimated speed of the vehicle. Based on these parameters, the end of the dead zone can be predicted. This prediction can be sent to the mobile unit by the base station prior to entry of the dead zone.

According to another aspect of the invention, the mobile unit can be loaded with the dead zone boundaries just prior to entering the dead zone, or could have a data base of selected dead zones. In this way, the mobile unit can keep track of its position relative to the other side of the dead zone by using GPS positioning, inertial navigation, or any other known means of determining position, and comparing this position information to the locally stored dead zone boundaries. The mobile unit then can use this position information to warn of the approach of the end of the dead zone.

According to another aspect of the invention, some of the GPS overhead can be removed once a car is in a dead zone by simply monitoring the distance traveled from the car's odometer. When the computer in the car determines that the vector distance exceeds the distance to the far edge of a dead zone, it tries to reestablish communication with a base station. Once established, the user is ready to communicate. If the car has capability for dead-reckoning or inertial navigation, for example, this can be used as well.

According to another aspect of the invention, in the case where the user (vehicle) stops in the dead zone, which can be determined by the base station after a given allocated time of no contact beyond the calculated estimated time expected for the user to transit the dead zone, the base station server can reconnect to all other remaining parties to the previously connected call, to respond that the cellular telephone user is in an unavailable wireless area (dead zone), and the estimated time for reconnect is currently unknown.

According to another aspect of the invention, a "countdown" can be implemented. That is, by an audio and/or visual indication, on the phone, the personal computer, or elsewhere in the vehicle, a voice/message would say, "you will be exiting (or entering) the dead zone shortly and can continue (or must discontinue) your conversation in 3 seconds, 2 seconds, 1 second, now." Alternatively, the approach to the dead zone entry or exit can be indicated by red, yellow or amber, and green lights, in the manner as already mentioned above. A flashing yellow or amber LED, for example, can make it clear to the cell phone user that they are near a dead zone. The faster the light blinks, the closer they are to either entering or exiting the dead zone.

Alternatively, or in addition to flashing lights, sounds could be used as cues to the approach of dead zone boundaries. For example, a series of beeping sounds can be used to indicate the approach of a dead zone. The shorter the interval between beeps, the closer to the dead zone boundary. Any number of user selectable audio cues could include a buzzer, a beeping sound that increases in intensity while approaching the dead zone, chimes, etc.

According to another aspect of the invention, a sensory cue could be provided, such as a vibrating steering wheel or seat cushion.

According to another aspect of the invention, if another user in a different vehicle or a land-based phone service tries to call the mobile user who happens to be in a dead zone, information can be given to the caller such as: "The party you are trying to call is currently unavailable and will be in a communication dead zone for one more minute", followed after 50 seconds by: "Your party will emerge from their current dead zone in 10 seconds, 9 seconds, . . . , 3 seconds, 2 seconds, 1 second . . ."

According to another aspect of the invention, the system can perform an automatic redial based on an estimated time of departure from a dead zone of a called party. The redial can be accurately timed assuming the party in the dead zone is following a known navigation route through the dead zone.

According to another aspect of the invention, if, while in the dead zone, the driver of the mobile unit attempts to place a call, the system forewarns him that he is currently in a dead zone, and will not exit for approximately a certain number of minutes based on his current path and rate of travel. The system then optionally can be set to automatically redial once the mobile unit leaves the dead zone.

Alternatively, should the driver wish to make the phone call sooner, and an alternate path is available that would exit the dead zone in less time, the system can advise the driver of this. In this scenario, some on-board storage of map information is provided, at least for providing an alternate path through the dead zone, since while in the dead zone, the base station cannot be consulted for this information. For example, compact disc read only memory (CD-ROM) map data could be accessed by an on-board reader integrated into the mobile unit communication system. Alternatively, all major routes through a dead zone could be downloaded from the base station to the mobile unit and placed in temporary storage just prior to the entry of the particular dead zone, for this purpose. The latter method may reduce the complexity and cost of a mobile unit implementing this particular feature. If the mobile unit is a fleet vehicle, for example, with a particular route area, e.g., a particular county within a particular state, or with a number of regularly scheduled routes, dead zone map information, including alternate paths through known dead zones within the route area or those regularly scheduled routes could be pre-programmed therein. Then, should the route driver need to take an alternate path through a dead zone so that communication can be reestablished sooner, the preprogrammed map information can be accessed to aid the route driver.

According to another aspect of the invention, the audio system in the mobile unit, e.g., a car stereo system, which could be playing a CD at the time, can be configured to mix in an audio message at the appropriate time informing the driver of dead zone approach, entry and exit.

According to another aspect of the invention, a message telling the driver to change the mobile unit's speed to a particular lower value so that a data transmission can finish sending prior to dead zone, can be implemented. This could take into account data priority of the mobile unit's data as compared to other data being transmitted by other users of the cellular system.

According to another aspect of the invention, if a data transfer is involved, the mobile unit is informed that it is about to enter a dead zone, and data transfer will be temporarily stopped. The mobile unit will be alerted once the data has been completely transferred after leaving the dead zone.

According to another aspect of the invention, and similar to the previous aspect, if the data is e-mail, the mobile unit will be able to see some of the e-mail and respond while in the dead zone. The remaining incoming e-mail, and the response outgoing e-mail, will be transferred after the mobile unit passes through and exits the dead zone.

According to another aspect of the invention, the mobile unit can be given the option of taking a new route around the dead zone. This option might be advantageous if, for example, the data or the phone call is critical and there is an alternate path.

Some advantages of exemplary embodiments of the invention include the customer care (value added service) provided by the wireless provider, and a reduction of wasted air-time, and thus cost to the wireless provider and to the cell-phone user for poor reception. This includes an improvement in the usage of the wireless infrastructure of the wireless provider because of the knowledge of the dead zones by the base stations. That is, by forewarning the cell phone users, dropping calls, as well as reestablishing the calls for the cell phone users, the wireless provider is able to maximize the usage of the infrastructure, especially in urban, or highly congested wireless areas.

Also, the services provided according to exemplary embodiments of the invention could be advertised as a "Customer care" service, and possibly the wireless provider could obtain additional revenues as a result of providing the improved services.

These and other aspects and advantages of the invention will become apparent from the detailed description set forth below.

DETAILED DESCRIPTION OF THE PREFERRED EMBODIMENT(S)

The invention will now be described in more detail by way of example with reference to the embodiment(s) shown in the accompanying figures. It should be kept in mind that the following described embodiment(s) is/are only presented by way of example and should not be construed as limiting the inventive concept to any particular physical configuration.

Figure 2:
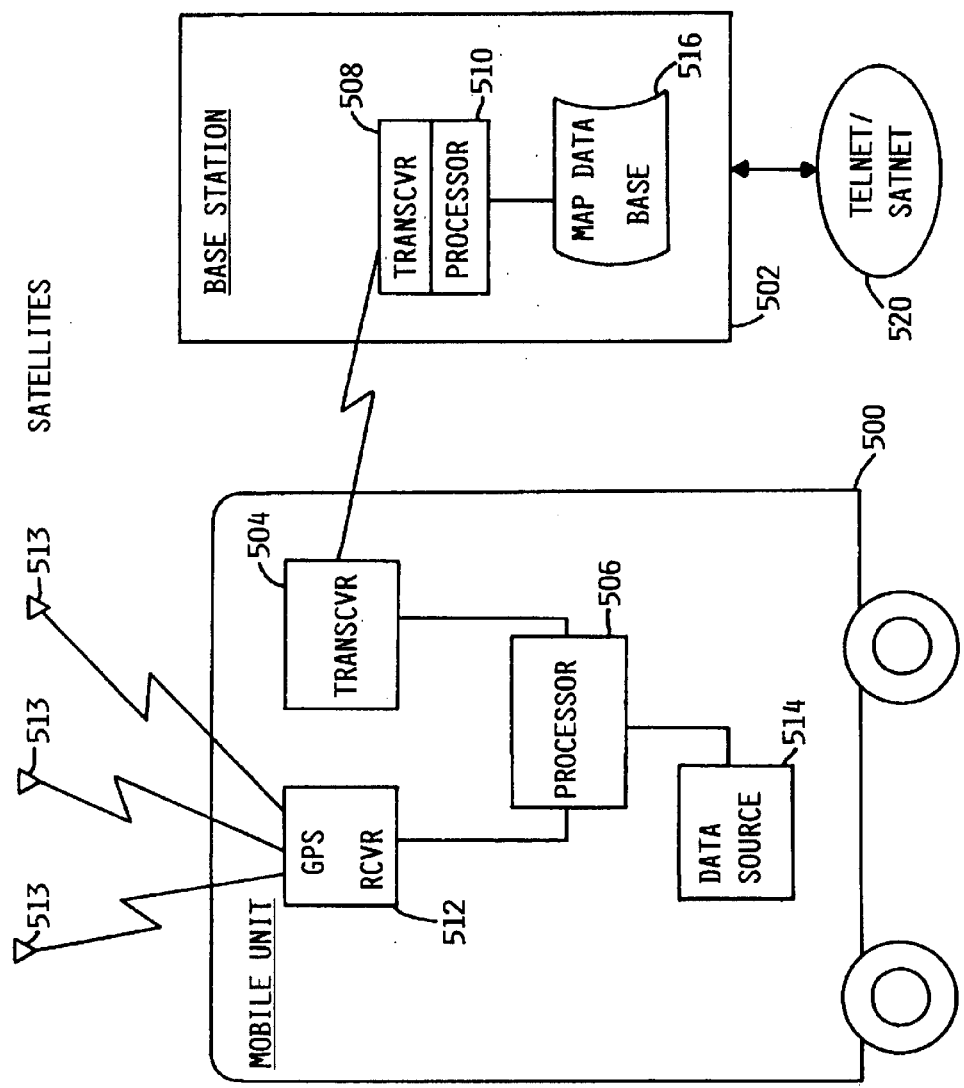
FIG. 2 illustrates an exemplary embodiment of a communications system according to the copending application Ser. No. 09/239,584.
Figure 3:
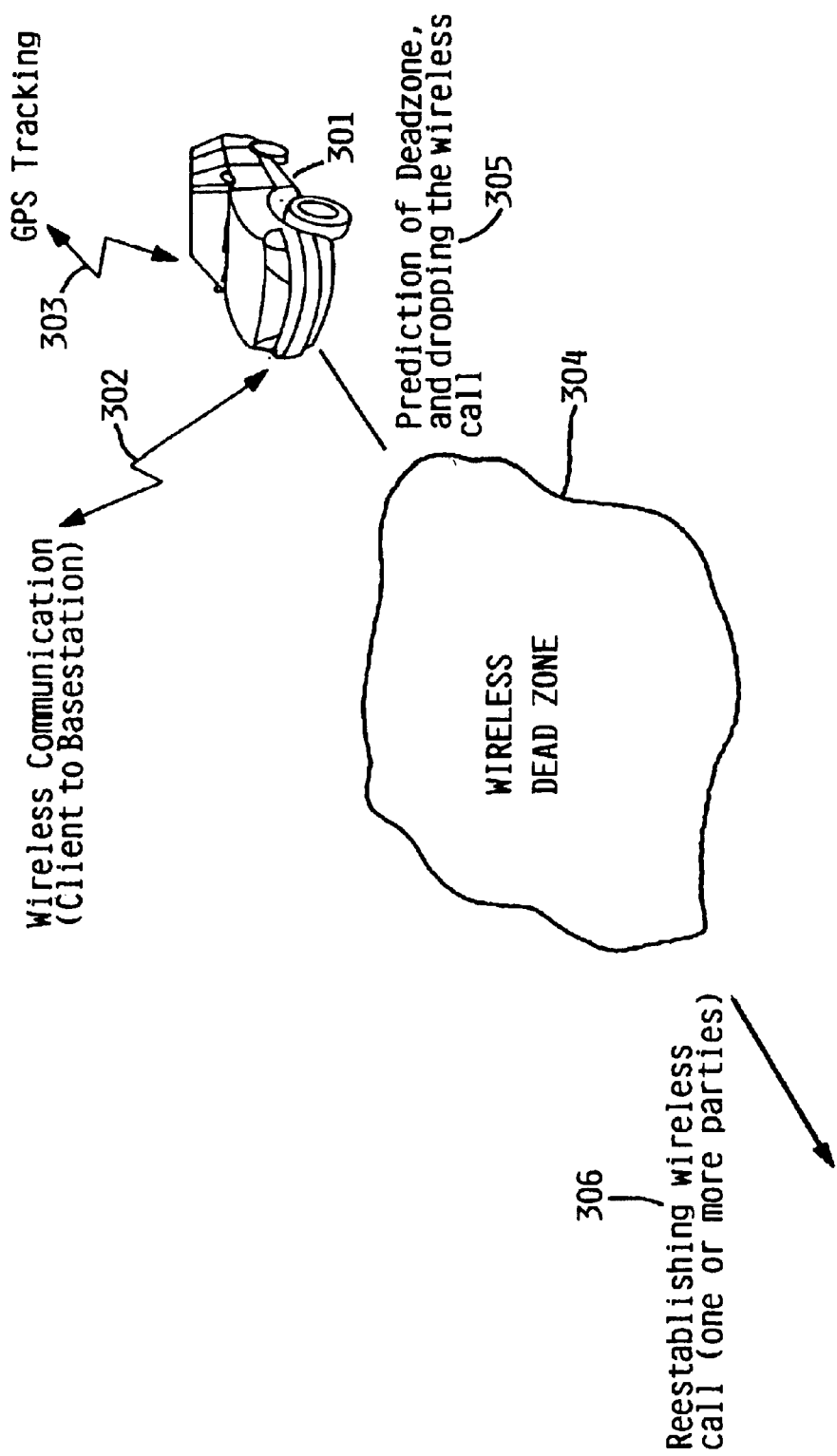
FIG. 3 illustrates a communications system according to an exemplary embodiment of the invention.

A diagram for illustrating the operation of an exemplary embodiment of the invention is shown in FIG. 3. In FIG. 3, a user is in an automobile 301 and is communicating by wireless communication transmission and reception 302 (e.g., cell phone communication) via a base station (see FIG. 2), with one or multiple individuals at other locations (not shown). For the purposes of discussion, we can assume that the other caller or callers are on land-line phones, however, they could also be communicating via cell phones with respective base stations.

FIG. 2 illustrates an example of a communications system infrastructure according to the copending application Ser. No. 09/239,584, which may be used to implement the present invention. A mobile unit communicates with a base station by means of a wireless communications medium (air). A transceiver 504 in the mobile unit 500, under control of a processor 506, transmits and receives signals with a corresponding transceiver 508 and processor 510 at the base station 502. The mobile station 500 also includes some global positioning capability, e.g., a GPS receiver 512 receiving signals from a plurality of GPS satellites 513. The mobile unit 500 may have a data source 514, such as a personal computer, fax machine, or the like, which sends blocks of data through the processor 506 and transceiver 504 to the base station 502. The base station 502 would of course be connected to a telephone network (telnet) or satellite communications network (satnet), or combination thereof, e.g., the Iridium system which is a combination of terrestrial, satellite, and cellular networks, as represented by block 520, as is conventional. A map data base 516 is provided at the base station 502 and contains a data base of identified areas where communication is weak or cutoff completely, i.e., dead zones, within the geographical area served by the base station 502.

The map data base 516 could also contain some geographical data about adjoining areas served by other base stations (not shown) for those situations where a mobile unit 500 is traveling towards such an area. In such a case, the base station 502 could transmit location information to the mobile unit 500 concerning dead zones that adjoin the area served by the base station 502. Or it could be the case that a dead zone actually spans areas served by two different base stations, and such information can be passed to the mobile unit 500.

The mobile unit processor 506 processes the GPS data, and sends position/direction of travel information to the base station 502. The base station processor 510 receives the mobile unit's position/direction of travel information and determines the mobile unit's position relative to known dead zones, as described earlier. The processor 510 may also update the information in the map data base 516 based on the mobile unit's position, and any detected transmission errors or signal weakening, for example.

Returning now to FIG. 3, during the phone call, the automobile 301 is providing GPS information obtained from GPS tracking 303 using GPS satellites (see also FIG. 2) interleaved in the audio wireless communications signal 302, for example, according to the protocol set forth above in TABLE 1, so that the wireless base station knows the position, direction and speed of the automobile 301. In addition, the base station, understands where the location of the dead zone 304 is, according to the methods described in the Background section above according to copending application Ser. No. 09/239,854. For example, with reference to FIG. 2, the base station 502 may have a map data base 516 with dead zone coordinates stored therein.

As has been mentioned earlier, dead zones are a common problem in the wireless infrastructure. The dead zone problem in the wireless infrastructure has to be dealt with on a daily basis. For example, there is a dead zone between Rochester, Minn. and Minneapolis, Minn., just south of Cannon Falls on Highway 52. Currently, if a wireless communications user is conducting a telephone call while driving to Minneapolis from Rochester, when the user approaches the dead zone, the user must forewarn the other parties on the call that the user is approaching a dead zone, and will be losing the call. The user must also let them know that once the call is lost due to the dead zone, the user will call them back in 5–10 minutes after passing through and exiting the dead zone.

However, as can be appreciated, it is not practical for a user to keep track of the exact locations and extents of every dead zone the user might encounter while driving from place to place. Therefore, entering unanticipated dead zones is bound to occur, resulting in annoying unexpected call interruptions. Further, having to try to remember to interrupt a call when a known dead zone entry is imminent can be distracting to the user. Also, having to manually re-dial and reconnect with the parties to the call after exiting the dead zone is time consuming and distracting while driving. The invention solves these problems.

Figure 1:
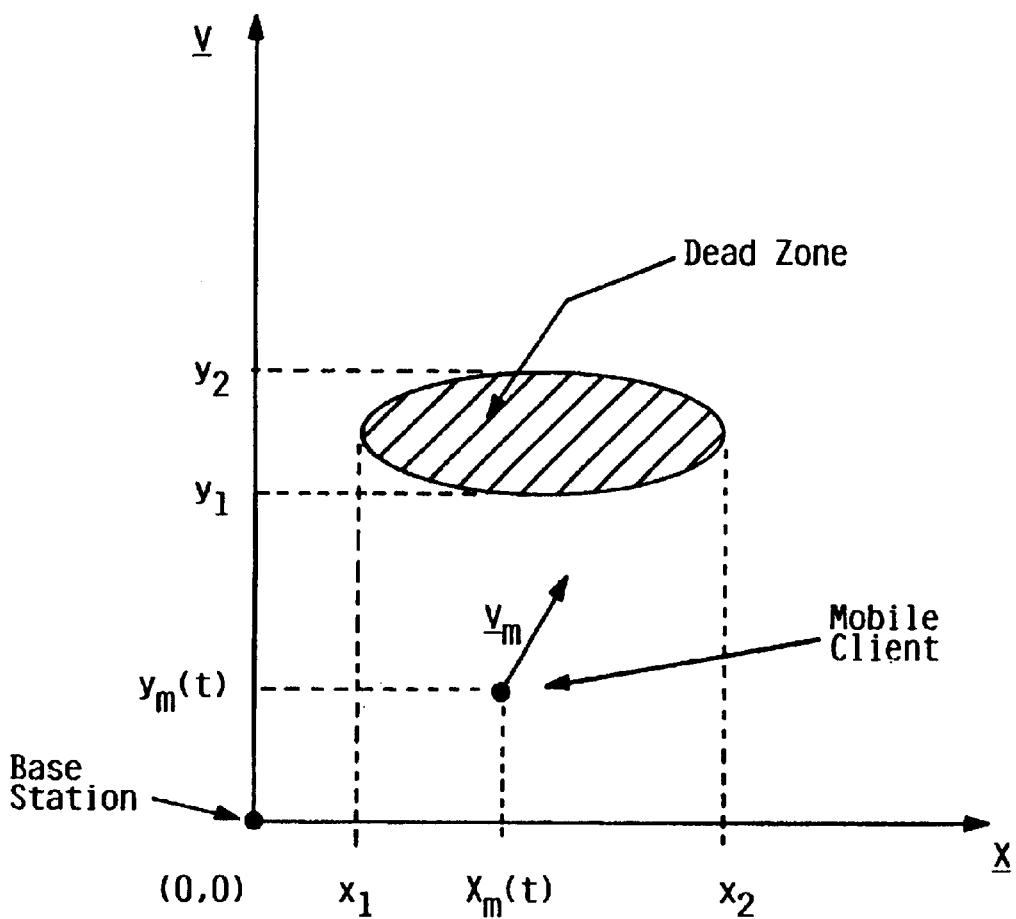
FIG. 1 illustrates a two-dimensional simplification of a mobile client, dead zone and base station scenario from copending application Ser. No. 09/239,854.

The infrastructure of the cellular network having a dead zone location system is assumed to be in place, as shown in FIGS. 1 and 2, and as described above and in copending application Ser. No. 09/239,854. The present invention provides an enhancement in functionality, as will now be explained in more detail.

The cellular network having a dead zone location system predicts the location of the dead zone 304, and as the mobile client (user) 301 approaches the dead zone 304, automatically drops the call affected, as indicated by 305 in FIG. 3. The affected call may involve one or more people, as noted earlier. The system then automatically frees up the bandwidth associated with the dropped call for another user. After the dead zone 304 has been traversed by the mobile client 301, the system gracefully reestablishes the dropped call as shown in FIG. 3, when the vehicle 301 leaves the dead zone 304, as indicated by 306 in FIG. 3.

In the above example, the cellular network having a dead zone location system is in full control of the infrastructure. It accommodates users not familiar with the terrain and dead zone locations, permitting them to none the less carry on productive work while in a mobile setting.

Further, the system can automatically interrupt the call before dropping it, with a message. The system's server/base station tracks the cellular telephone user and the possible pathway (or pathways) through the dead zone. When the server predicts that the driver will be passing through the dead zone, the base station temporary interrupts the call to state that "User A" is approaching a dead zone. A number of possible messages or actions could be set up by the cellular telephone user.

A message can be sent stating that the cellular telephone user will be entering a dead zone within a certain period of time and instructing the cellular telephone user or users on what actions to take. For example, the message directed to the mobile user about to enter a dead zone could be "You will be approaching a dead zone in the next 2 minutes. Please end the call at this time. You will need to reconnect after 10 minutes."

Alternatively, the message could state what action the cellular telephone system will be taking automatically. For example, the message might be: "You are approaching a dead zone in the next 2 minutes. I will be dropping the call in 1 minute and will reconnect within the next 10 minutes after passage through the dead zone." As previously disclosed in copending application Ser. No. 09/238,854, the time calculated for passing through the dead zone can be based on the dead zone size and the estimated speed of the vehicle.

In a case where the user (vehicle) stops in the dead zone, which can be determined after a given allocated time of no contact beyond the calculated estimated time expected for the user to transit the dead zone, the server can reconnect to all other remaining parties to the previously connected call and inform them that the cellular telephone user is in an unavailable wireless area (dead zone), and the estimated time for reconnect is currently unknown.

Advantageously, by forewarning the cell phone users, automatically dropping calls, as well as automatically reestablishing the calls for the cell phone users, the wireless provider can maximize the usage of the infrastructure, especially in urban, or highly congested wireless areas.

Therefore, according to the invention, as cellular phone user is approaching a wireless dead zone which is known by a server/base station, the server/base station tracks the cellular telephone user and the possible pathway (or pathways) through the dead zone. If the server predicts that the driver will be passing through the dead zone, the base station temporary interrupts the call to state that "User A" is approaching a dead zone.

A number of possible messages or actions could be set up by the cellular telephone user. A message can be sent stating that the cellular telephone user will be entering a dead zone within a certain period of time and instructing the cellular telephone user or users on what actions to take. For example, the message could be a voice message such as: "You will be approaching a dead zone in the next 2 minutes. Please end the call at this time. You will need to reconnect after 10 minutes."

An automatic disconnect and reconnect can be provided based on dead zone entry and exit. The automatic reconnect can be provided by the cellular system as a standard feature or as a paid option.

A message can state what action the cellular telephone system will be taking automatically. For example, the voice message might be: "You are approaching a dead zone and will be entering the dead zone in approximately the next 2 minutes. I will be dropping the call in 1 minute and will reconnect within the next 10 minutes after passage through the dead zone."

If a data transmission is involved, such as e-mail or data download, similar measures can be implemented. Instead of a voice message being heard through the cellular telephone headset or ear-piece, the message can be directed to the user's personal computer audio system, for example. Alternatively, the message can be displayed on the screen of the personal computer.

A flashing light somewhere in the user's vehicle can be used to warn of an impending dead zone. In this case, a yellow or amber light could initially be flashed slowly as the user approaches a dead zone and then the flashing could speed up the closer to the dead zone the user gets. Once in the dead zone, a red light could be flashed. As the user approaches the end of the dead zone, the amber or yellow light could again flash first slowly and then more rapidly, until as the user exits the dead zone, the light could change to green to indicate the dead zone has been exited.

As previously disclosed in copending application Ser. No. 09/238,854, the time calculated for passing through the dead zone can be based on the dead zone size and the estimated speed of the vehicle. Based on these parameters, the end of the dead zone can be predicted. This prediction can be sent to the mobile unit by the base station prior to entry of the dead zone.

The mobile unit can be loaded with the dead zone boundaries just prior to entering the dead zone, or could have a data base of selected dead zones. In this way, the mobile unit can keep track of its position relative to the other side of the dead zone by using GPS positioning, inertial navigation, or any other known means of determining position, and comparing this position information to the locally stored dead zone boundaries. The mobile unit then can use this position information to warn of the approach of the end of the dead zone.

Some of the GPS overhead can be removed once a car is in a dead zone by simply monitoring the distance traveled from the car's odometer. When the computer in the car determines that the vector distance exceeds the distance to the far edge of a dead zone, it tries to reestablish communication with a base station. Once established, the user is ready to communicate. If the car has capability for dead-reckoning or inertial navigation, for example, this can be used as well.

In the case where the user (vehicle) stops in the dead zone, which can be determined by the base station after a given allocated time of no contact beyond the calculated estimated time expected for the user to transit the dead zone, the base station server can reconnect to all other remaining parties to the previously connected call, to respond that the cellular telephone user is in an unavailable wireless area (dead zone), and the estimated time for reconnect is currently unknown.

A "countdown" to dead zone boundary can be implemented. That is, by an audio and/or visual indication, on the phone, the personal computer, or elsewhere in the vehicle, a voice/message would say, "you will be exiting (or entering) the dead zone shortly and can continue (or must discontinue) your conversation in 3 seconds, 2 seconds, 1 second, now." Alternatively, the approach to the dead zone entry or exit can be indicated by red, yellow or amber, and green lights, in the manner as already mentioned above. A flashing yellow or amber LED, for example, can make it clear to the cell phone user that they are near a dead zone. The faster the light blinks, the closer they are to either entering or exiting the dead zone.

Alternatively, or in addition to flashing lights, sounds could be used as cues to the approach of dead zone boundaries. For example, a series of beeping sounds can be used to indicate the approach of a dead zone. The shorter the interval between beeps, the closer to the dead zone boundary. Any number of user selectable audio cues could include a buzzer, a beeping sound that increases in intensity while approaching the dead zone, chimes, etc.

A tactile sensory cue could be provided, such as a vibrating steering wheel or seat cushion.

If another user in a different vehicle or a land-based phone service tries to call the mobile user who happens to be in a dead zone, information can be given to the caller such as: "The party you are trying to call is currently unavailable and will be in a communication dead zone for one more minute", followed after 50 seconds by: "Your party will emerge from their current dead zone in 10 seconds, 9 seconds, . . . , 3 seconds, 2 seconds, 1 second . . . " The system can perform an automatic redial based on an estimated time of departure from a dead zone of a called party. The redial can be accurately timed assuming the party in the dead zone is following a known navigation route through the dead zone.

If, while in the dead zone, the driver of the mobile unit attempts to place a call, the system forewarns him that he is currently in a dead zone, and will not exit for approximately a certain number of minutes based on his current path and rate of travel. The system then optionally can be set to automatically redial once the mobile unit leaves the dead zone.

Alternatively, should the driver wish to make the phone call sooner, and an alternate path is available that would exit the dead zone in less time, the system can advise the driver of this. In this scenario, some on-board storage of map information is provided, at least for providing an alternate path through the dead zone, since while in the dead zone, the base station cannot be consulted for this information. For example, compact disc read only memory (CD-ROM) map data could be accessed by an on-board reader integrated into the mobile unit communication system. Alternatively, all major routes through a dead zone could be downloaded from the base station to the mobile unit and placed in temporary storage just prior to the entry of the particular dead zone, for this purpose. The latter method may reduce the complexity and cost of a mobile unit implementing this particular feature. If the mobile unit is a fleet vehicle, for example, with a particular route area, e.g., a particular county within a particular state, or with a number of regularly scheduled routes, dead zone map information, including alternate paths through known dead zones within the route area or those regularly scheduled routes could be pre-programmed therein. Then, should the route driver need to take an alternate path through a dead zone so that communication can be reestablished sooner, the preprogrammed map information can be accessed to aid the route driver.

The audio system in the mobile unit, e.g., a car stereo system, which could be playing a CD at the time, can be configured to mix in an audio message at the appropriate time informing the driver of dead zone approach, entry and exit.

A message telling the driver to change the mobile unit's speed to a particular lower value so that a data transmission can finish sending prior to dead zone, can be implemented. This could take into account data priority of the mobile unit's data as compared to other data being transmitted by other users of the cellular system.

The invention may be embodied as a computer program product. A computer program product includes a recording medium substrate, such as a floppy disk, a high-capacity read only memory in the form of an optically read compact disc or CD-ROM, a tape, a transmission type media, such as a digital or analog communications link, or a similar computer program product.

It will be apparent to one skilled in the art that the manner of making and using the claimed invention has been adequately disclosed in the above-written description of the preferred embodiment(s) taken together with the drawings.

It will be understood that the above described preferred embodiment(s) of the present invention are susceptible to various modifications, changes, and adaptations, and the same are intended to be comprehended within the meaning and range of equivalents of the appended claims.

Further, although a number of equivalent components may have been mentioned herein which could be used in place of the components illustrated and described with reference to the preferred embodiment(s), this is not meant to be an exhaustive treatment of all the possible equivalents, nor to limit the invention defined by the claims to any particular equivalent or combination thereof. A person skilled in the art would realize that there may be other equivalent components presently known, or to be developed, which could be used within the spirit and scope of the invention defined by the claims.

For example, the cell phone user location could be determined by one of a Global Positioning Satellite system (GPS), line-of-sight, wireless triangulation, or an equivalent location determination system. The mobile wireless user could be using an automotive, bicycle, train, airplane, walking, or using any other form of transportation.

What is claimed is:

1. In a communication system having a base station and a mobile unit, a method of handling a call between the mobile unit and at least one other party through the base station, comprising:

determining a location and direction of travel of the mobile unit relative to an identified dead zone;

controlling the call between the mobile unit and the at least one other party based on the determining;

wherein the controlling comprises:

performing an orderly automatic disconnection of the call before the mobile unit enters the dead zone; and
sending a first indication to the mobile unit and the at least one other party that a dead zone is being approached and that the call will be automatically disconnected.

2. The method according to claim 1, wherein the controlling further comprises performing an orderly automatic reconnection of the call between the mobile unit and the at least one other party as the mobile unit exits the dead zone.

3. The method according to claim 2, wherein the controlling further comprises sending a second indication to the at least one other party that the dead zone is being exited by the mobile unit that the call is being automatically reconnected.

4. The method according to claim 3, wherein the first indication includes information about how much time remains before the dead zone is entered and the call is disconnected.

5. The method according to claim 4, wherein the second indication includes information about how much time remains before the dead zone is exited and the call is reconnected.

6. The method according to claim 5, wherein the first and second indications comprise audible indications.

7. The method according to claim 6, wherein the audible indications comprise at least one of recorded speech or synthesized speech.

8. The method according to claim 6, wherein at least one of the first and second audible indications includes a series of tones which change in at least one of volume, pitch and/or repetition rate, to indicate much time remains before the dead zone is entered or exited, respectively.

9. The method according to claim 5, wherein the first and second indications comprise visible indications.

10. The method according to claim 9, wherein the visible indications comprise alpha-numeric characters.

11. The method according to claim 9, wherein the visible indications comprise at least one light.

12. The method according to claim 11, wherein the at least one light is controlled to change in at least one of brightness, color and/or flashing repetition rate, to indicate much time remains before the dead zone is entered or exited, respectively.

13. The method according to claim 12, wherein the at least one light is green when the mobile unit is not relatively near any approaching dead zone, amber when the mobile unit is relatively near an approaching dead zone, and red when the mobile unit is in a dead zone.

14. The method according to claim 12, wherein the at least one light flashes faster as the mobile unit gets closer to a dead zone entry or exit boundary.

15. The method according to claim 5, wherein the first and second indications comprise tactile indications.

16. The method according to claim 15, wherein the first and second tactile indications comprise a vibrating steering wheel in the mobile unit.

17. The method according to claim 1, wherein the call comprises a voice communication.

18. The method according to claim 1, wherein the call comprises a data communication.

19. The method according to claim 1, wherein the call comprises voice and data communications.

20. The method according to claim 1, wherein while the mobile unit is in the dead zone, the method further comprising:
providing a count down to an estimated time when the mobile unit will exit the dead zone.

21. The method according to claim 1, wherein while the mobile unit is in the dead zone, the method further comprising:
providing an indication of alternative routes through the dead zone and the estimated time to exit the dead zone of each alternative route.

22. The method according to claim 1, wherein the determining a location and direction of travel of the mobile unit comprises at least one of:
utilizing a global positioning satellite system;
utilizing an inertial navigation system;
utilizing an odometer of the mobile unit; and/or
utilizing a dead reckoning system.

23. An article of manufacture comprising a computer program product, the computer program product comprising a substrate and means disposed on the substrate for causing a computer system to implement a method of handling a call according to claim 1.

24. The method according to claim 1, wherein if data is being transmitted in the call, further comprising:
determining whether the data transmission can be completed before the dead zone is entered; and
informing the mobile unit what if any changes in mobile unit speed would be required to complete the data transmission before the dead zone is entered and the call disconnected.

25. The method according to claim 1, further comprising:
providing the mobile unit with an alternative path around the dead zone to avoid interrupting the call.

26. In a communication system having a base station and a mobile unit, a method of handling a call between the mobile unit and at least one other party through the base station, comprising:
determining a location and direction of travel of the mobile unit relative to an identified dead zone;
controlling the call between the mobile unit and the at least one other party based on the determining;
wherein the controlling comprises:
sending an indication to the mobile unit and the at least one other party when a dead zone is being approached by the mobile unit;
instructing the mobile unit and the at least one other party how to end the call; and
informing the mobile unit and the at least one other party how to reconnect the call after a specified time, the specified time being based on the speed of the mobile unit and the distance through the dead zone along the current path of the mobile unit.

27. In a communication system having a base station and a mobile unit, a method of handling a call between the mobile unit and at least one other party through the base station, comprising:
determining a location and direction of travel of the mobile unit relative to an identified dead zone;
controlling the call between the mobile unit and the at least one other party based on the determining;
wherein the controlling comprises:
performing an orderly automatic disconnection of the call before the mobile unit enters the dead zone;
performing an orderly automatic reconnection of the call between the mobile unit and the at least one other party as the mobile unit exits the dead zone; and
if data is being transmitted in the call:
informing the mobile unit that data transmission will be interrupted before entering the dead zone;

after exiting the dead zone, resuming the data transmission; and informing the mobile unit when the data transmission has been completed.

28. The method according to claim 27, wherein if the data is incoming e-mail:

while the mobile unit is in the dead zone, displaying in the mobile unit as much of the incoming e-mail as was received prior to entering the dead zone;

storing outgoing e-mail in the mobile unit; and when the mobile unit exits the dead zone, receiving any remaining incoming e-mail with the mobile unit and transmitting the stored outgoing e-mail from the mobile unit.

29. In a communication system having a base station and a mobile unit, a method of handling a call between the mobile unit and at least one other party through the base station, comprising:

determining a location and direction of travel of the mobile unit relative to an identified dead zone;

controlling the call between the mobile unit and the at least one other party based on the determining;

wherein the controlling comprises:

performing an orderly automatic disconnection of the call before the mobile unit enters the dead zone;

wherein while the mobile unit is in the dead zone, the method further comprising:

in response to an attempt to make a call by the mobile unit, informing the mobile unit of an estimated time remaining before exiting the dead zone; and in response to an attempt by an other party to place a call to the mobile unit, informing the other party of an estimated time remaining before the mobile unit exits the dead zone.

30. The method according to claim 29, wherein call information is stored and a call is automatically placed when the estimated time remaining before the mobile unit exits the dead zone has elapsed.

31. A call handling system for facilitating wireless communication between at least one mobile unit and at least one other party through a base station having a communication zone, comprising:

positioning means in the at least one mobile unit for determining an instantaneous geographical position and direction of travel of the at least one mobile unit;

forwarding means in the at least one mobile unit for forwarding the instantaneous geographical position and direction of travel of the at least one mobile unit to the base station;

identified communication area data base means in the base station for storing a data base of identified communication area locations within the communication zone;

comparing means in the base station for comparing the forwarded instantaneous geographical position and direction of travel of the at least one mobile unit with the data base of identified dead zones within the communication zone, and determining a relative position of the at least one mobile unit with respect to the identified communication area locations; and handling means in at least one of the base station and the mobile unit, for performing an orderly automatic disconnection of a call before the mobile unit enters one of the identified dead zones and for sending a first indication to the mobile unit and the at least one other party that a dead zone is being approached and that the call will be automatically disconnected.

32. The call handling system according to claim 31, wherein the handling means further comprises means for performing an orderly automatic reconnection of the call with the mobile unit as the mobile unit exits the dead zone.

33. The call handling system according to claim 32, wherein the handling means further comprises means for sending a second indication to the at least one other party that the dead zone is being exited by the mobile unit that the call is being automatically reconnected.

34. The call handling system according to claim 33, wherein the first indication includes information about how much time remains before the dead zone is entered and the call is disconnected.

35. The call handling system according to claim 34, wherein the second indication includes information about how much time remains before the dead zone is exited and the call is reconnected.

36. In a communication system having a base station and a mobile unit, a method of handling a call between the mobile unit through the base station, comprising:

determining a location and direction of travel of the mobile unit relative to an identified dead zone;

controlling the call between the mobile unit based on the determining;

wherein the controlling comprises:

performing an orderly automatic disconnection of the call before the mobile unit enters the dead zone; and sending a first indication to the mobile unit that a dead zone is being approached and that the call will be automatically disconnected.

* * * * *